United States Patent
Rai et al.

(10) Patent No.: US 8,204,433 B2
(45) Date of Patent: Jun. 19, 2012

(54) WIRELESS COMMUNICATION SYSTEM FACILITATING COMMUNICATIONS THROUGH LOCAL NETWORKS

(75) Inventors: Vikram Rai, Randolph, NJ (US); Rui A. Silva, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1967 days.

(21) Appl. No.: 11/091,560

(22) Filed: Mar. 28, 2005

(65) Prior Publication Data
US 2006/0215598 A1 Sep. 28, 2006

(51) Int. Cl.
*H04B 7/185* (2006.01)
*H04B 7/14* (2006.01)
*H04B 3/36* (2006.01)
*H04W 4/00* (2009.01)

(52) U.S. Cl. ............. 455/13.1; 455/7; 455/14; 370/315; 370/316; 370/328

(58) Field of Classification Search ............. 455/7, 13.1, 455/15, 17; 370/535, 536, 537, 315, 316, 370/328
See application file for complete search history.

(56) References Cited

U.S. PATENT DOCUMENTS

| | | | |
|---|---|---|---|
| 6,490,459 B1 * | 12/2002 | Sugaya et al. | 455/517 |
| 6,535,498 B1 * | 3/2003 | Larsson et al. | 370/338 |
| 6,697,603 B1 * | 2/2004 | Lovinggood et al. | 455/13.1 |
| 6,823,180 B2 * | 11/2004 | Reed et al. | 455/305 |
| 7,092,434 B2 * | 8/2006 | Moon et al. | 375/211 |
| 2002/0025779 A1 * | 2/2002 | Knight et al. | 455/11.1 |
| 2003/0073403 A1 * | 4/2003 | Miyazaki | 455/7 |
| 2003/0124976 A1 * | 7/2003 | Tamaki et al. | 455/15 |
| 2007/0010196 A1 * | 1/2007 | Periyalwar et al. | 455/7 |
| 2007/0155314 A1 * | 7/2007 | Mohebbi | 455/11.1 |
| 2007/0178831 A1 * | 8/2007 | Takeda et al. | 455/7 |

* cited by examiner

*Primary Examiner* — Un C Cho
(74) *Attorney, Agent, or Firm* — Carlson, Gaskey & Olds, PC

(57) ABSTRACT

A wireless communication system (20) includes a base station (22) that is capable of communicating with a plurality of intermediate cells (24, 60). Each intermediate cell (24, 60) directly communicates with a plurality of end users (26, 64). Communications from an end user (26, 64) may be routed through the intermediate cell to a wireless network (30) associated with the base station (22) or directly to another intermediate cell in a disclosed example. The intermediate cells communicate with the base station on behalf of the end users such that the wireless network recognizes the intermediate cell as a single user and, in one example, assigns temporary listed directory numbers to each of the end users associated with each intermediate cell so that communications from each end user may be handled individually.

18 Claims, 1 Drawing Sheet

WIRELESS COMMUNICATION SYSTEM FACILITATING COMMUNICATIONS THROUGH LOCAL NETWORKS

FIELD OF THE INVENTION

This invention generally relates to telecommunications. More particularly, this invention relates to wireless communication systems.

DESCRIPTION OF THE RELATED ART

Wireless communication systems are well known and in widespread use. The most common use of such systems is for voice communications using cell phones. More recently, uses of such systems for data communications, video communications and combinations of voice, data and video have grown in popularity. As wireless service providers increase their capabilities, there are increasing demands for such services.

One challenge facing wireless service providers is continuously upgrading the capacity and capabilities of their systems. Those skilled in the art are always striving to find ways to provide enhanced services or new services. Various improvements have been made in this area. For example, different signaling techniques and channel configurations have been proposed for increasing bandwidth and throughput. Additionally, techniques have been proposed for better handling various communication types such as voice, data or combinations of both.

Wireless communications have also been used in other contexts. For example, wireless fidelity (Wi-Fi) has become useful for various IEEE 802.11 networks. Such networks allow for devices to communicate with each other using radio frequency signals, for example. Such wireless fidelity arrangements have become useful for local area networks, for example.

One difference between wireless communication systems used for cell phone communications and wireless fidelity systems, for example, is the range of possible communication and the manner in which communications are handled. Wireless communication systems use circuit switched connections, for example, to provide wide-ranging communications. Wireless fidelity networks typically facilitate limited, short-range communications. While the two system types are not directly compatible, it would be useful to take advantage of characteristics of both to enhance wireless communication capabilities.

This invention provides an enhanced wireless communication system that is capable of taking advantage of other arrangements such as wireless local area networks. A disclosed example embodiment expands on the traditional single-wireless link per call to multiple wireless links per session.

SUMMARY OF THE INVENTION

An exemplary disclosed method of communicating includes communicating between a base station and an intermediate cell on behalf of a plurality of end users that communicate directly with the intermediate cell.

In one example, the intermediate cell multiplexes communications from the various end users and an appropriate portion of the wireless network associated with the base station demultiplexes the signals and routes each of them to an appropriate destination. With such an example, an individual end user can communicate through a local area network intermediate cell with another device that may use wireless technology, a wire line connection or may be an internet end point. The end user can utilize the resources of the wireless network associated with the base station even though the end user communicates directly with the intermediate cell rather than directly with the base station.

In one example, a plurality of intermediate cells communicate with a base station and each intermediate cell has an associated plurality of end users. In one example, one of the intermediate cells communicates with another intermediate cell on behalf of end users associated with the respective intermediate cells. In one example, each intermediate cell has an indication of neighboring intermediate cells and the associated end users for each neighboring intermediate cell. An intermediate cell determines if a signal from a first end user associated with it is intended for a second end user associated with one of the neighboring intermediate cells. If so, the intermediate cell directs the communication from the first end user directly to the neighboring intermediate cell, without requiring involvement of the base station.

In one example, the intermediate cells utilize a first communication protocol for communicating directly with the end users or neighboring intermediate cells and a second communication protocol for communicating with the base station.

One advantage to a disclosed example is that the intermediate cell can use one communication channel with the base station on behalf of the plurality of end users, which reserves resources for potentially providing more service to more end users. Another advantage of a disclosed example is that it provides an opportunity to quickly create a mesh network in an economical manner.

The various features and advantages of this invention will become apparent to those skilled in the art from the following detailed description. The drawings that accompany the detailed description can be briefly described as follows.

DETAILED DESCRIPTION

Figure 1:
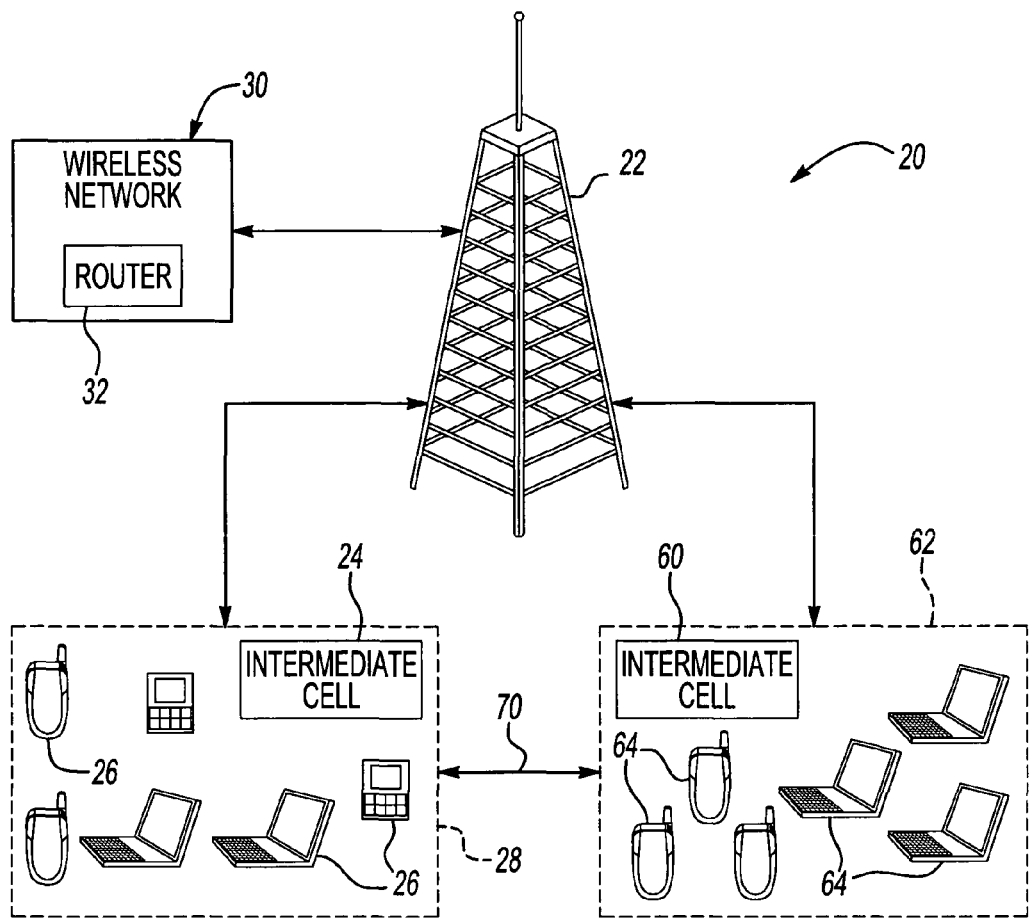
FIG. 1 schematically shows selected portions of a wireless communication system designed according to an embodiment of this invention.

FIG. 1 schematically shows selected portions of a wireless communication system 20. A base station 22 communicates with an intermediate cell 24. A plurality of end users 26 communicate directly with the intermediate cell 24. In this example, the end users 26 utilize wireless communication devices such as cell phones, notebook computers, personal digital assistants or other known devices for such purposes. The end users 26 in this example are part of a local area network 28. Communications between the end users 26 and the intermediate cell 24 in one example utilize known wireless fidelity techniques. One example includes an IEEE 802.11 communication standard. A variety of communication protocols between the end users 26 and the intermediate cell 24 may be used, depending on the needs of a particular situation. In one example, the intermediate cell 24 is capable of communicating with the end users' devices using wireless signaling or hardwired connection technology.

The intermediate cell 24 communicates with the base station 22 on behalf of the end users 26 schematically shown in FIG. 1. In one example, the "front end" of the intermediate cell 24 is responsible for the direct communications with the end users 26. The "back end" or "backhaul" of the intermediate cell 24 handles cellular or PCS frequency communications with the base station 22. The intermediate cell 24 effectively collects all communications from the end users 26 and transmits them to the base station 22. The base station 22 collects such communications and transports them over an appropriate backhaul connection to appropriate portions of a wireless communication network 30. In the illustrated example, a network router portion 32 is responsible for routing the individual communications from the individual end users 26 to an appropriate destination.

In one example, a different communication protocol is used between the intermediate cell 24 and the end users 26 compared to the communication protocol used between the intermediate cell 24 and the base station 22. For example, the communications between the intermediate cell and the end users 26 may comprise an IEEE 802.11 standard (any one of the versions of that standard). At the same time, the communication protocol used between the intermediate cell and the base station 22 may be any one of CDMA 2000, UMTS, GSM or EVDO, as examples. Any known communication protocol in a cellular wireless communication system may be used. The intermediate cell 24 in one example includes a cellular modem that uses an appropriate wireless data standard based upon the configuration of the base station 22.

One feature of the example local area network 28 is that it can be configured or reconfigured relatively easily using known techniques. For example, the number of end users 26 at any given time may change. The local area network 28 may be a dedicated, semi-permanent, established system or it may be a temporary set-up used for particular situations, for example.

The design of the device used as the intermediate cell 24, such as a radio controller, will dictate how many end users can be associated with it. In one example, each intermediate cell can handle less than fifty end user calls using an IEEE 802.11 standard with TCP/IP stacks to facilitate communications. Similarly, the device chosen as the intermediate cell 24 will dictate to whom the network 28 is accessible.

Each intermediate cell 24 preferably has an ability to provide a local address to each of the end users 26 and to communicate information regarding them to the wireless network 30. The intermediate cell 24 has a single address used by the example wireless network 30 and each individual end user 26 associated with that intermediate cell receives a temporary listed directory number for use by the wireless network 30. In one example, the intermediate cell 24 uses a 48 bit Ethernet identification for each end user 26. This identification is provided to the wireless network 30 in some format that allows the wireless network 30 to assign an appropriate listed directory number so that each individual end user can be reached from anywhere that is capable of communicating with the wireless network 30. In some sense, this use of a temporary listed directory number resembles known current roaming standards such as IS-41.

One advantage to the illustrated arrangement is that the intermediate cell 24 is treated as an individual user and uses the same resources over the air interface with the base station 22 as would a single user of one of the end user devices 26. Accordingly, a plurality of end users effectively use one communication channel with the base station 22 through the intermediate cell 24. This configuration allows for reserving base station resources (i.e., available channels) and can improve the availability of service to more end users provided by the wireless communication system 30.

Figure 2:
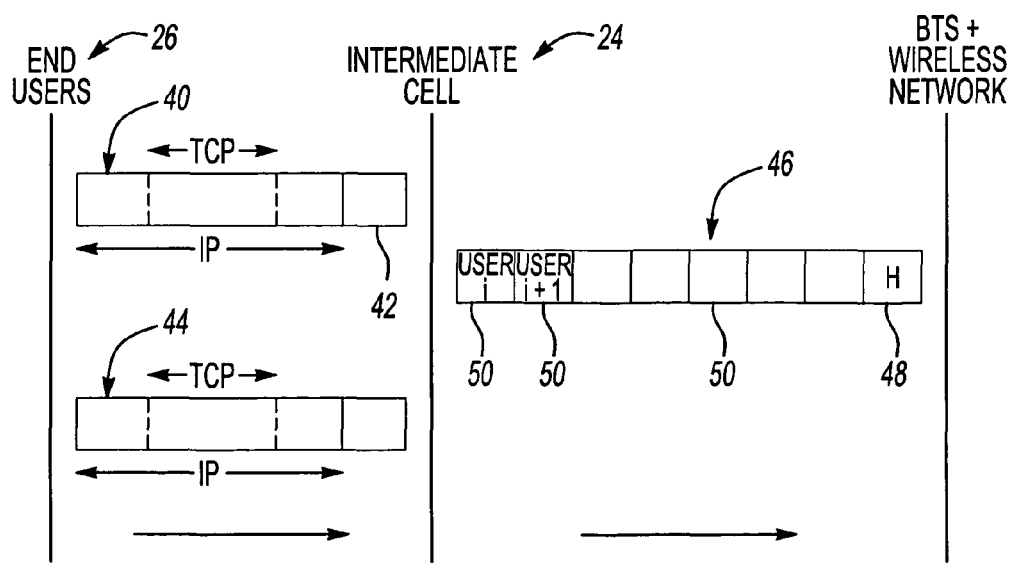
FIG. 2 schematically shows a signaling strategy associated with one example embodiment.

FIG. 2 schematically illustrates one signaling strategy used for communicating with the wireless network 30 on behalf of the end users 26. A plurality of communications are provided by each of the end users 26 to the intermediate cell 24. One example communication is shown at 40. A header 42 includes information according to the appropriate interface used for communicating between the end user 26 and the intermediate cell 24. In this example, the header 42 includes an identification of the end user. An IEEE 802.11 header is used in one example. The end-to-end protocol in this example is TCP/IP with a first layer being the air interface (802.11 b/g); a second layer being a bit synchronous protocol based on LAPD/HDLC, for example; a third layer being internet protocol; and a fourth layer being TCP. Another example communication 44, which may be from the same end user 26 as the communication 40 or may be from another end user 26, and the communication 40 are provided to the intermediate cell 24 using the appropriate protocol.

The intermediate cell 24 receives and then converts the communications 40, 44 to the appropriate protocol for communicating with the base station 22. A single communication 46 from the intermediate cell 24 to the base station 22 includes a header 48 that identifies the intermediate cell as the user, for example. The converted individual communications 40, 44 from the various end users 26 are multiplexed packets 50 within the communication 46.

After the base station 22 receives the communication 46, it communicates it to the wireless network 30. In one example, communications between the base station 22 and other portions of the wireless network 30 have the form of the original data stream (i.e., the communication 46) from the intermediate cell to the base station and capsulated with WAN headers. The router 32 in one example, strips off the cellular data protocol headers and demultiplexes the packets 50 of the data stream to route the individual communication packets 50 to an appropriate destination.

Referring again to FIG. 1, another intermediate cell 60 communicates with the base station 22. A local area network 62 includes a plurality of end users 64 that communicate with the intermediate cell 60 using an appropriate communication protocol such as an IEEE 802.11 standard. The intermediate cell 60 operates in the same manner as the intermediate cell 24.

One feature of the example of FIG. 1 is that the intermediate cells 24 and 60 are both capable of communicating directly with the base station 22 or directly with another intermediate cell as schematically shown at 70. For example, one of the end users 26 may desire to communicate with one of the end users 64. Rather than having to route such a communication to the base station 22 and through the wireless network 30, the intermediate cell 24 in this example transmits that communication directly to the intermediate cell 60. Such a communication need not be converted to the communication protocol of the wireless network 30. Assuming the two intermediate cells use the same communication standard with their associated end users, no conversion is necessary provided that the intermediate cells are close enough to communicate using that same standard.

In one example, each intermediate cell has a list of any neighboring intermediate cells and a routing table of the end users associated with each of the neighboring intermediate cells. Such a listing is updated on a frequent basis as the participants in any one of the local networks such as 28 or 62 may change from time to time. When the intermediate cell 24 receives a communication from one of the end users 26 in this example, the intermediate cell 24 determines whether that communication is intended for any of the end users associated with any of the neighboring intermediate cells. If so, the intermediate cell 24 attempts to direct that communication directly to the appropriate intermediate cell, which then forwards it to the appropriate end user.

In one example, an intermediate cell attempts a communication with a neighboring cell under such circumstances. If such an attempted communication fails, the originating intermediate cell then routes the communication through the wireless network 30 by communicating with the base station 22 as if the intended recipient were not a member of the network associated with the neighboring intermediate cell. Such an arrangement accounts for situations where the communication with an intermediate cell may fail but the communication link with the base station 22 is reliable.

By having a wireless network 30 and a base station 22, for example, treating separate radio controllers or intermediate cells 24 as individual users, the disclosed examples allow for service providers or government agencies, for example, to create mesh networks in a rapid fashion in a very economical manner. Using cellular backhaul and the intermediate cells as described above provides instant access to the data packet infrastructure of the wireless network 30 on behalf of the end users.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   communicating between a base station and an intermediate cell on behalf of a plurality of end users that communicate directly with the intermediate cell, the base station having a backhaul connection with a wireless communication network, the intermediate cell using over air resources with the base station as would a single one of the end users such that the intermediate cell is treated as an individual user.

2. The method of claim 1, comprising multiplexing a plurality of communications from a plurality of the end users into a single communication from the intermediate cell to the base station.

3. The method of claim 2, comprising
   demultiplexing the multiplexed communications after receipt at the base station;
   determining the intended recipient of each of the demultiplexed communications; and
   routing each of the demultiplexed communications to the respective intended recipients.

4. The method of claim 1, comprising
   communicating between the intermediate cell and the end users using a first communication format;
   communicating between the intermediate cell and the base station using a second communication format.

5. The method of claim 4, comprising converting communications from the end users to the intermediate cell in the first format to the second format before communicating the communications between the intermediate cell and the base station.

6. The method of claim 4, comprising multiplexing a plurality of communications from a plurality of the end users as part of a communication from the intermediate cell to the base station.

7. The method of claim 1, comprising communicating between the base station and a plurality of intermediate cells, wherein each intermediate cell has an associated plurality of end users in direct communication with the intermediate cell.

8. The method of claim 1, comprising selectively communicating directly between a first and a second intermediate cell on behalf a first end user in direct communication with the first intermediate cell and a second end user in direct communication with the second intermediate cell to communicate at least one signal between the first and second end users.

9. The method of claim 8, comprising
   providing each intermediate cell with an indication of neighboring intermediate cells and the associated end users for each of the neighboring intermediate cells;
   determining if a signal from the first end user is intended for the second end user;
   determining if the second intermediate cell is one of the neighboring intermediate cells; and
   communicating the signal directly from the first intermediate cell to the second intermediate cell when the second intermediate cell is a neighboring cell and the second end user is associated with the second intermediate cell.

10. The method of claim 1, comprising
    determining which intermediate cell is associated with a selected end user;
    directing a communication intended for the selected end user to the associated intermediate cell.

11. The method of claim 10, comprising forwarding the directed communication from the associated intermediate cell to the selected end user.

12. The method of claim 1, wherein the intermediate cell comprises a networking device.

13. The method of claim 1, comprising changing the end users associated with the intermediate cell.

14. The method of claim 1, comprising assigning at least a temporary address to each end user associated with the intermediate cell.

15. The method of claim 14, comprising using the assigned address when communicating with the base station on behalf of a corresponding one of the end users to indicate the end user from which a communication originates.

16. The method of claim 14, comprising
    using the assigned addresses to identify the end users; and
    providing at least one of the assigned addresses or the identities of the end users to the base station to facilitate the base station directing a communication from a remote source to at least one of the end users through the intermediate cell.

17. A method of communicating, comprising:
    communicating between a base station and an intermediate cell on behalf of a plurality of end users that communicate directly with the intermediate cell, wherein a communication between the base station and the intermediate cell comprises a plurality of communications from a plurality of the end users multiplexed into a single communication from the intermediate cell to the base station.

18. The method of claim 17, comprising:
    demultiplexing the multiplexed communications after receipt at the base station;
    determining the intended recipient of each of the demultiplexed communications; and
    routing each of the demultiplexed communications to the respective intended recipients.

* * * * *